United States Patent [19]
Suesada et al.

[11] Patent Number: 5,233,433
[45] Date of Patent: Aug. 3, 1993

[54] RECORDING DIGITAL VCR AND A REPRODUCING DIGITAL VCR FOR RECORDING AND REPRODUCING A DIGITAL PAL SIGNAL

[75] Inventors: Kunio Suesada, Ikoma; Toshiaki Koya, Kadoma, both of Japan

[73] Assignee: Matsushita Electric Industrial Co., Ltd., Osaka, Japan

[21] Appl. No.: 474,092

[22] PCT Filed: Sep. 1, 1989

[86] PCT No.: PCT/JP89/00902
§ 371 Date: May 2, 1990
§ 102(e) Date: May 2, 1990

[87] PCT Pub. No.: WO90/03083
PCT Pub. Date: Mar. 22, 1990

[30] Foreign Application Priority Data
Sep. 2, 1988 [JP] Japan ............... 63-220955
Sep. 13, 1988 [JP] Japan ............... 63-229110

[51] Int. Cl.⁵ .......................... H04N 5/76
[52] U.S. Cl. ................. 358/310; 358/324; 358/312; 358/13; 358/17
[58] Field of Search ........... 358/310, 312, 314, 319, 358/320, 321, 322, 323, 324, 325, 326, 13, 17, 18, 19; 360/33.1, 36.2

[56] References Cited
U.S. PATENT DOCUMENTS

| | | |
|---|---|---|
| 4,345,272 | 8/1982 | Shirota . |
| 4,392,162 | 7/1983 | Yamamoto . |
| 4,460,925 | 7/1984 | Devereux ............... 358/312 |
| 4,519,001 | 5/1985 | Morrison ............... 358/314 |
| 4,716,454 | 12/1987 | Oldershaw et al. . |
| 4,763,203 | 8/1988 | Oldershaw et al. ........ 358/320 |

Primary Examiner—Tommy Chin
Assistant Examiner—Huy Nguyen
Attorney, Agent, or Firm—Wenderoth, Lind & Ponack

[57] ABSTRACT

A recording digital VCR for recording digital PAL signals sampled at four times the chrominance subcarrier frequency, includes: a selection range shifter for shifting a sample in the horizontal direction by two samples depending on the field number; a sync. ID attacher for attaching sync. and ID including the field number; and an RF recorder for recording the signals on the tape. When the data signals recorded on the tape are reproduced at a high speed, samples stored across the fields in a reproduction memory can have the same address and same phase. Thus, it is possible to realize a recording format for reproducing a color at a high speed which has an excellent picture quality.

4 Claims, 30 Drawing Sheets

FIG. 8

| sample | n-1 | n | n+1 | n+2 |
|---|---|---|---|---|
| m-2 | | 4 | | 0 |
| (m-2) | | 7 | | 3 |
| m-1 | | 2 | | 6 |
| (m-1) | | 5 | | 1 |
| m | | 0 | | 4 |
| (m) | | 3 | | 7 |
| m+1 | | 6 | | 2 |
| (m+1) | | 1 | | 5 |
| m+2 | | 4 | | 0 |

(row labels under "line")

FIG. 9

| field | 0 | | 1 | | 2 | | 3 | | 4 | | 5 | | 6 | | 7 | |
|---|---|---|---|---|---|---|---|---|---|---|---|---|---|---|---|---|
| sample | 0 | 1/2 | 0 | 1/2 | 0 | 1/2 | 0 | 1/2 | 0 | 1/2 | 0 | 1/2 | 0 | 1/2 | 0 | 1/2 |
| mode 0 line0 | | | | O | | O | | | | | | | | O | | |
| line1 | O | | | | | | O | | | | O | | | | | |
| line2 | | | | | | | | | | O | | | | | | O |
| line3 | | | | | | | | | | | | | | | | |
| mode 1 line0 | | | | | | | | | | | | | | | | |
| line1 | | O | | O | | O | | O | | O | | O | | O | | |
| line2 | | | | | | O | | | | | | | | | | |
| line3 | | | | | | | | | | | | O | | O | | |

| field | 0, 1 | | | 2, 3 | | | 4, 5 | | | 6, 7 | | |
|---|---|---|---|---|---|---|---|---|---|---|---|---|
| sample \ line | n-1 | n | n+1 | n+2 | n-1 | n | n+1 | n+2 | n-1 | n | n+1 | n+2 | n-1 | n | n+1 | n+2 |
| (m-2) | — | — | — | — | ○ | — | ○ | ○ | ○ | ○ | ○ | ○ | — | ○ | — | ○ |
| m-1 | ○ | ○ | ○ | ○ | — | ○ | — | ○ | — | — | — | — | ○ | — | ○ | — |
| (m-1) | — | — | — | — | ○ | — | ○ | — | ○ | ○ | ○ | ○ | ○ | ○ | ○ | — |
| m | ○ | ○ | ○ | ○ | — | ○ | — | ○ | — | — | — | — | — | — | — | ○ |
| (m) | — | — | — | — | ○ | — | ○ | — | ○ | ○ | ○ | ○ | ○ | ○ | — | ○ |
| m+1 | ○ | ○ | ○ | ○ | — | ○ | — | ○ | — | — | — | — | — | — | ○ | — |
| (m+1) | — | — | — | — | — | ○ | ○ | ○ | ○ | ○ | ○ | ○ | ○ | ○ | ○ | — |
| m+2 | ○ | ○ | ○ | ○ | ○ | — | — | — | — | — | — | — | — | — | — | ○ |

FIG. 12

| field | | 0, 1 | | | 2, 3 | | | 4, 5 | | | 6, 7 | | |
|---|---|---|---|---|---|---|---|---|---|---|---|---|
| sample | n−1 | n | n+1 | n+2 | n−1 | n | n+1 | n+2 | n−1 | n | n+1 | n+2 | n−1 | n | n+1 | n+2 |
| (m−2) | ○ | ○ | ○ | ○ | − | ○ | − | ○ | − | − | − | − | ○ | − | ○ | − |
| m−1 | − | − | − | − | ○ | − | ○ | − | ○ | ○ | ○ | ○ | − | ○ | − | ○ |
| (m−1) | ○ | ○ | ○ | ○ | − | − | ○ | − | − | − | − | − | − | − | − | ○ |
| m | − | − | − | − | ○ | ○ | − | ○ | ○ | ○ | ○ | ○ | ○ | ○ | ○ | − |
| (m) | ○ | ○ | ○ | ○ | − | ○ | − | ○ | − | − | − | − | − | ○ | ○ | − |
| m+1 | − | − | − | − | ○ | − | ○ | − | ○ | ○ | ○ | ○ | − | − | − | ○ |
| (m+1) | ○ | ○ | ○ | ○ | − | − | ○ | − | − | − | − | − | − | − | ○ | ○ |
| m+2 | − | − | − | − | ○ | ○ | − | ○ | ○ | ○ | ○ | ○ | ○ | ○ | − | − | line

FIG. 13

| field | | 0, 1 | | | 2, 3 | | | 4, 5 | | | 6, 7 | | |
|---|---|---|---|---|---|---|---|---|---|---|---|---|
| sample | | n−1 | n | n+1 | n+2 | n−1 | n | n+1 | n+2 | n−1 | n | n+1 | n+2 |
| line | (m−2) | ○ | − | ○ | − | − | − | − | − | − | ○ | ○ | ○ |
| | m−1 | − | ○ | − | ○ | ○ | ○ | ○ | ○ | ○ | − | − | − |
| | (m−1) | − | ○ | − | ○ | − | − | − | − | ○ | ○ | ○ | ○ |
| | m | ○ | − | ○ | − | ○ | ○ | ○ | ○ | − | − | − | − |
| | (m) | ○ | − | ○ | − | − | − | − | − | − | ○ | ○ | ○ |
| | m+1 | − | ○ | − | ○ | ○ | ○ | ○ | ○ | ○ | − | − | − |
| | (m+1) | − | ○ | − | ○ | − | − | − | − | ○ | ○ | ○ | ○ |
| | m+2 | ○ | − | ○ | − | ○ | ○ | ○ | ○ | − | − | − | − |

FIG. 14

| field | 0, 1 | | | | 2, 3 | | | | 4, 5 | | | | 6, 7 | | | |
|---|---|---|---|---|---|---|---|---|---|---|---|---|---|---|---|---|
| sample | n−1 | n | n+1 | n+2 | n−1 | n | n+1 | n+2 | n−1 | n | n+1 | n+2 | n−1 | n | n+1 | n+2 |
| (m−2) | — | O | — | O | O | O | O | O | O | — | O | — | — | O | — | O |
| m−1 | O | — | O | — | O | O | O | O | — | O | — | O | O | — | O | — |
| (m−1) | O | — | O | — | O | O | O | O | — | O | — | O | O | — | O | — |
| m | — | O | — | O | O | O | O | O | O | — | O | — | — | O | — | O |
| (m) | — | O | — | O | O | O | O | O | O | — | O | — | — | O | — | O |
| m+1 | O | — | O | — | O | O | O | O | — | O | — | O | O | — | O | — |
| (m+1) | O | — | O | — | O | O | O | O | — | O | — | O | O | — | O | — |
| m+2 | — | O | — | O | O | O | O | O | O | — | O | — | — | O | — | O | line

| field | 0, 1 | | | | 2, 3 | | | | 4, 5 | | | | 6, 7 | | | |
|---|---|---|---|---|---|---|---|---|---|---|---|---|---|---|---|---|
| sample | n−1 | n | n+1 | n+2 | n−1 | n | n+1 | n+2 | n−1 | n | n+1 | n+2 | n−1 | n | n+1 | n+2 |
| (m−2) | − | − | − | − | ○ | − | ○ | − | ○ | ○ | ○ | ○ | − | ○ | − | ○ |
| m−1 | ○ | ○ | ○ | ○ | − | ○ | − | ○ | − | − | − | − | ○ | − | ○ | − |
| (m−1) | − | − | − | − | − | ○ | − | ○ | ○ | ○ | ○ | ○ | ○ | − | ○ | − |
| m | ○ | ○ | ○ | ○ | ○ | − | ○ | − | − | − | − | − | − | ○ | − | ○ |
| (m) | ○ | − | − | − | ○ | − | ○ | − | ○ | ○ | ○ | ○ | ○ | − | ○ | − |
| m+1 | − | ○ | ○ | ○ | − | ○ | − | ○ | − | − | − | − | − | ○ | − | ○ |
| (m+1) | − | ○ | − | − | ○ | − | ○ | − | ○ | ○ | ○ | ○ | ○ | − | ○ | − |
| m+2 | ○ | − | ○ | ○ | − | ○ | − | ○ | − | − | − | − | − | ○ | − | ○ | line

FIG. 17

| field | | 0, 1 | | | | 2, 3 | | | | 4, 5 | | | | 6, 7 | | | |
|---|---|---|---|---|---|---|---|---|---|---|---|---|---|---|---|---|---|
| sample | | n-1 | n | n+1 | n+2 | n-1 | n | n+1 | n+2 | n-1 | n | n+1 | n+2 | n-1 | n | n+1 | n+2 |
| line | (m-2) | — | O | — | O | O | O | O | O | — | O | O | — | — | — | — | — |
| | m-1 | O | — | O | — | — | — | — | — | — | O | O | — | O | O | O | O |
| | (m-1) | O | — | O | — | O | O | O | O | — | O | O | — | — | — | — | — |
| | m | — | O | — | O | — | — | — | — | O | — | — | O | O | O | O | O |
| | (m) | — | O | — | O | O | O | O | O | O | — | — | O | — | — | — | — |
| | m+1 | O | — | O | — | — | — | — | — | — | O | O | — | O | O | O | O |
| | (m+1) | O | — | O | — | O | O | O | O | — | O | O | — | — | — | — | — |
| | m+2 | — | O | — | O | — | — | — | — | O | — | — | O | O | O | O | O |

FIG. 18

| field | 0, 1 | | | 2, 3 | | | 4, 5 | | | 6, 7 | | |
|---|---|---|---|---|---|---|---|---|---|---|---|---|
| sample \ line | n−1 | n | n+1 | n+2 | n−1 | n | n+1 | n+2 | n−1 | n | n+1 | n+2 |
| (m−2) | O | − | O | − | − | − | − | − | − | O | O | O |
| m−1 | − | O | − | O | O | O | O | O | O | − | − | − |
| (m−1) | − | O | − | O | − | − | − | − | O | − | − | − |
| m | O | − | O | − | O | O | O | O | − | O | O | O |
| (m) | O | − | O | − | − | − | − | − | − | O | O | O |
| m+1 | − | O | − | O | O | O | O | O | O | − | − | − |
| (m+1) | − | O | − | O | − | − | − | − | O | − | − | − |
| m+2 | O | − | O | − | O | O | O | O | − | O | O | O |

FIG. 19

| difference of burst phase | in-phase | | | | out-of-phase | | | |
|---|---|---|---|---|---|---|---|---|
| angular difference of sampling axis | 0 | -90 | -180 | -270 | 0 | -90 | -180 | -270 |
| original sampling axis | − | − | − | − | 135 45 / -45 -135 | 135 45 / -45 -135 | − | 135 45 / -45 -135 |
| reverse control signal | 0 | 0 | 1 | 1 | 1 | 1 | 0 | 0 |

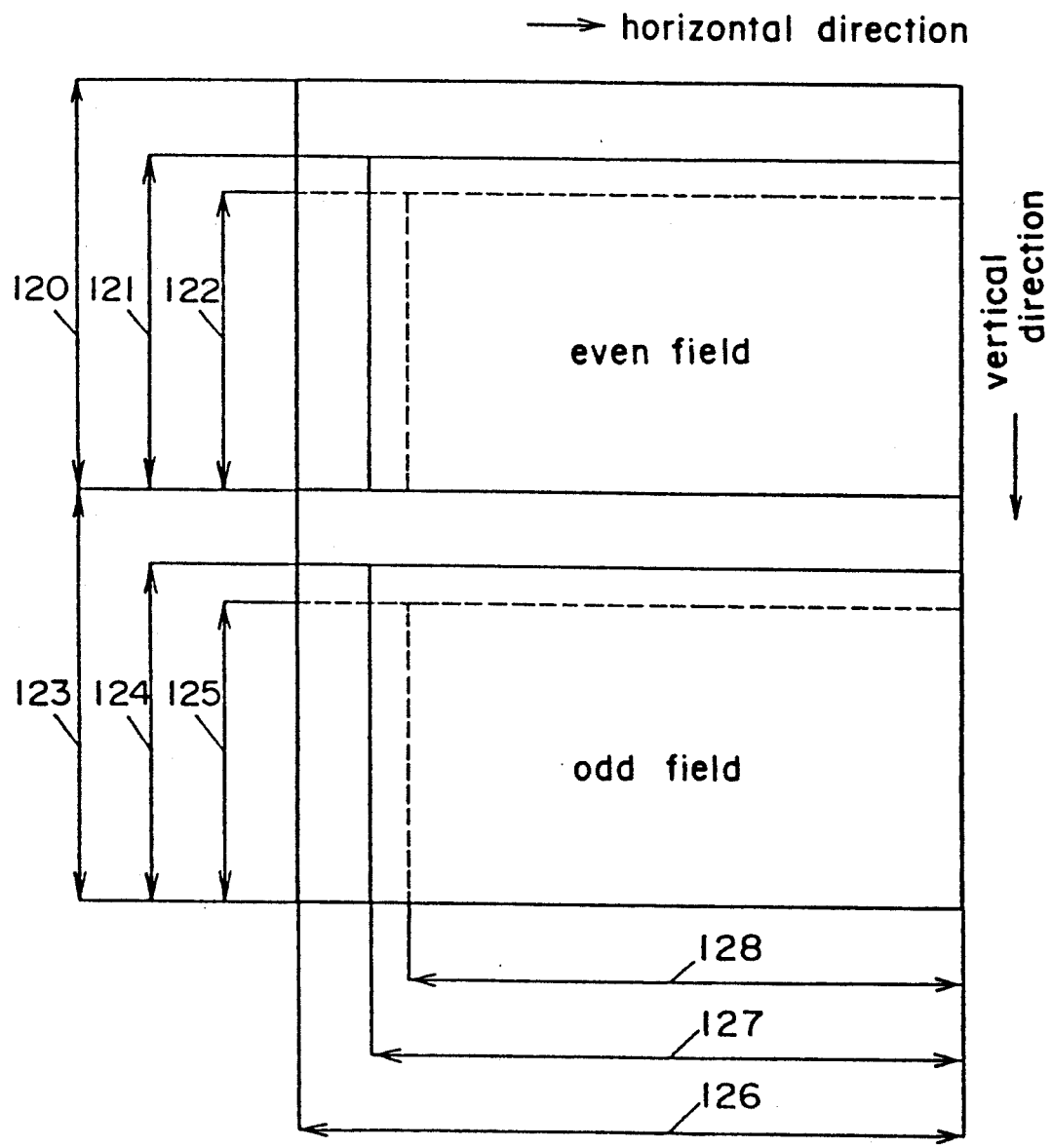
F I G. 20

FIG. 21

| field | | 0, 1 | | | 2, 3 | | | 4, 5 | | | 6, 7 | | |
|---|---|---|---|---|---|---|---|---|---|---|---|---|
| sample | | n-1 | n | n+1 | n+2 | n-1 | n | n+1 | n+2 | n-1 | n | n+1 | n+2 |
| line | m-2 | +Q | +R | +S | +P | -P | -Q | -R | -S | +S | -S | -P | -Q |
| | (m-2) | -R | -S | -P | -Q | +Q | +R | +S | -P | | | | |
| | m-1 | -P | -Q | -R | -S | +S | +P | -R | -Q | | | | |
| | (m-1) | +Q | +R | +S | +P | -P | -Q | -R | -S | | | | |
| | m | +S | +P | +Q | +R | -R | -S | -P | +Q | | | | |
| | (m) | -P | -Q | -S | -P | +P | +R | +S | +Q | | | | |
| | m+1 | -R | -S | -P | -Q | +Q | +R | +S | -P | | | | |
| | (m+1) | +S | +P | +Q | +R | -R | -S | +Q | -R | | | | |
| | m+2 | +Q | +R | +S | +P | -P | -Q | -R | -S | | | | |

FIG. 22

| sample | n-1 | n | n+1 | n+2 |
|---|---|---|---|---|
| m-2 |  | 4 |  | 0 |
| (m-2) |  | 7 |  | 3 |
| m-1 |  | 2 |  | 6 |
| (m-1) |  | 5 |  | 1 |
| m |  | 0 |  | 4 |
| (m) |  | 3 |  | 7 |
| m+1 |  | 6 |  | 2 |
| (m+1) |  | 1 |  | 5 |
| m+2 |  | 4 |  | 0 |

(line)

| field | 0, 1 | | | | 2, 3 | | | | 4, 5 | | | | 6, 7 | | | |
|---|---|---|---|---|---|---|---|---|---|---|---|---|---|---|---|---|
| sample \ line | n-1 | n | n+1 | n+2 | n-1 | n | n+1 | n+2 | n-1 | n | n+1 | n+2 | n-1 | n | n+1 | n+2 |
| (m-2) | — | — | — | — | O | O | — | O | O | O | O | O | O | — | O | — |
| m-1 | O | O | O | O | — | — | O | — | — | — | — | — | — | O | — | O |
| (m-1) | — | — | — | — | O | — | O | O | O | O | O | O | O | O | — | O |
| m | O | O | O | O | — | O | — | — | — | — | — | — | — | — | O | — |
| (m) | — | — | — | — | — | O | O | O | O | O | O | O | O | — | O | — |
| m+1 | O | O | O | O | O | — | — | — | — | — | — | — | — | O | — | O |
| (m+1) | — | — | — | — | O | — | O | O | O | O | O | O | O | O | — | O |
| m+2 | O | O | O | O | — | O | — | — | — | — | — | — | — | — | O | — |

FIG. 25

| field | 0, 1 | | | | 2, 3 | | | | 4, 5 | | | | 6, 7 | | | |
|---|---|---|---|---|---|---|---|---|---|---|---|---|---|---|---|---|
| sample | n-1 | n | n+1 | n+2 | n-1 | n | n+1 | n+2 | n-1 | n | n+1 | n+2 | n-1 | n | n+1 | n+2 |
| (m-2) | a | a | a | a | O | — | O | — | — | — | — | — | — | O | — | O |
| m-1 | — | — | — | — | — | O | — | O | O | O | O | O | O | — | O | — |
| (m-1) | a | a | a | a | — | O | — | O | — | — | — | — | — | O | O | — |
| m | — | — | — | — | O | — | O | — | O | O | O | O | O | — | — | O |
| (m) | a | a | a | a | O | — | O | — | — | — | — | — | — | O | O | — |
| m+1 | — | — | — | — | — | O | — | O | O | O | O | O | O | — | — | O |
| (m+1) | a | a | a | a | — | O | — | O | — | — | — | — | — | O | O | — |
| m+2 | — | — | — | — | O | — | O | — | O | O | O | O | O | — | — | O | line

FIG. 26

| field | 0, 1 | | | | 2, 3 | | | | 4, 5 | | | | 6, 7 | | | |
|---|---|---|---|---|---|---|---|---|---|---|---|---|---|---|---|---|
| sample | n-1 | n | n+1 | n+2 | n-1 | n | n+1 | n+2 | n-1 | n | n+1 | n+2 | n-1 | n | n+1 | n+2 |
| (m-2) | — | ○ | ○ | ○ | — | — | — | — | ○ | — | ○ | — | ○ | ○ | ○ | ○ |
| m-1 | ○ | — | — | — | ○ | ○ | ○ | ○ | — | ○ | — | ○ | — | — | — | — |
| (m-1) | ○ | — | — | — | — | — | — | ○ | — | ○ | — | ○ | ○ | ○ | ○ | ○ |
| m | — | ○ | ○ | ○ | ○ | ○ | ○ | — | ○ | — | ○ | — | — | — | — | — |
| (m) | — | ○ | ○ | ○ | — | — | — | ○ | ○ | ○ | ○ | — | ○ | ○ | ○ | ○ |
| m+1 | ○ | — | — | — | ○ | ○ | ○ | — | — | — | — | ○ | — | — | — | — |
| (m+1) | ○ | — | — | — | — | — | — | ○ | — | ○ | — | ○ | ○ | ○ | ○ | ○ |
| m+2 | — | ○ | ○ | ○ | ○ | ○ | ○ | — | ○ | — | ○ | — | — | — | — | — | line

FIG. 27

| field | 0, 1 | | | | 2, 3 | | | | 4, 5 | | | | 6, 7 | | | |
|---|---|---|---|---|---|---|---|---|---|---|---|---|---|---|---|---|
| sample \ line | n-1 | n | n+1 | n+2 | n-1 | n | n+1 | n+2 | n-1 | n | n+1 | n+2 | n-1 | n | n+1 | n+2 |
| (m-2) | O | — | O | — | O | O | O | O | — | O | O | O | — | — | — | — |
| m-1 | — | O | — | O | — | — | — | — | O | — | O | — | O | O | O | O |
| (m-1) | O | O | — | O | O | O | O | O | O | O | O | — | — | — | — | — |
| m | O | — | O | — | — | — | — | — | — | O | — | O | O | O | O | O |
| (m) | O | — | O | — | O | O | O | O | — | O | O | O | — | — | — | — |
| m+1 | — | O | — | O | — | — | — | — | O | — | O | — | O | O | O | O |
| (m+1) | O | O | — | O | O | O | O | O | O | O | O | — | — | — | — | — |
| m+2 | — | — | O | — | — | — | — | — | — | O | — | O | O | O | O | O |

FIG. 28

| field | 0, 1 | | | | 2, 3 | | | | 4, 5 | | | | 6, 7 | | | |
|---|---|---|---|---|---|---|---|---|---|---|---|---|---|---|---|---|
| sample \ line | n-1 | n | n+1 | n+2 | n-1 | n | n+1 | n+2 | n-1 | n | n+1 | n+2 | n-1 | n | n+1 | n+2 |
| (m-2) | ○ | ○ | ○ | ○ | ○ | ○ | ○ | — | — | — | — | — | — | ○ | — | ○ |
| m-1 | — | — | — | — | — | — | — | ○ | ○ | ○ | ○ | ○ | ○ | — | ○ | — |
| (m-1) | ○ | ○ | ○ | ○ | — | ○ | ○ | ○ | — | — | — | — | ○ | ○ | ○ | — |
| m | — | — | — | — | ○ | — | — | — | ○ | ○ | ○ | ○ | — | — | — | ○ |
| (m) | ○ | ○ | ○ | ○ | ○ | ○ | ○ | — | — | — | — | — | ○ | ○ | — | ○ |
| m+1 | — | — | — | — | — | — | — | ○ | ○ | ○ | ○ | ○ | — | — | ○ | — |
| (m+1) | ○ | ○ | ○ | ○ | — | ○ | ○ | ○ | — | — | — | — | — | ○ | ○ | — |
| m+2 | — | — | — | — | ○ | — | — | — | ○ | ○ | ○ | ○ | ○ | — | — | ○ |

FIG. 29

| field | | 0, 1 | | | 2, 3 | | | 4, 5 | | | 6, 7 | | |
|---|---|---|---|---|---|---|---|---|---|---|---|---|---|
| sample | | n-1 | n | n+1 | n+2 | n-1 | n | n+1 | n+2 | n-1 | n | n+1 | n+2 |
| line | (m-2) | — | — | — | — | — | ○ | — | ○ | ○ | — | ○ | — |
| | m-1 | ○ | ○ | ○ | ○ | ○ | — | ○ | — | — | ○ | — | ○ |
| | (m-1) | — | — | — | — | ○ | — | ○ | — | — | ○ | ○ | — |
| | m | ○ | ○ | ○ | ○ | — | ○ | — | ○ | ○ | — | — | ○ |
| | (m) | — | — | — | — | — | ○ | — | ○ | ○ | — | ○ | — |
| | m+1 | ○ | ○ | ○ | ○ | ○ | — | ○ | — | — | ○ | — | ○ |
| | (m+1) | — | — | — | — | ○ | — | ○ | — | — | ○ | ○ | — |
| | m+2 | ○ | ○ | ○ | ○ | — | ○ | — | ○ | ○ | — | — | ○ |

FIG. 30

| field | 0, 1 | | | | 2, 3 | | | | 4, 5 | | | | 6, 7 | | | |
|---|---|---|---|---|---|---|---|---|---|---|---|---|---|---|---|---|
| sample | n-1 | n | n+1 | n+2 | n-1 | n | n+1 | n+2 | n-1 | n | n+1 | n+2 | n-1 | n | n+1 | n+2 |
| (m-2) | ○ | — | ○ | — | ○ | ○ | ○ | ○ | — | ○ | — | ○ | — | — | — | — |
| m-1 | — | ○ | — | ○ | — | — | — | — | ○ | — | ○ | — | ○ | ○ | ○ | ○ |
| (m-1) | — | ○ | — | ○ | ○ | ○ | ○ | ○ | ○ | — | ○ | — | — | — | — | — |
| m | ○ | — | ○ | — | — | — | — | — | — | ○ | — | ○ | ○ | ○ | ○ | ○ |
| (m) | ○ | — | ○ | — | ○ | ○ | ○ | ○ | ○ | — | ○ | — | — | — | — | — |
| m+1 | — | ○ | — | ○ | — | — | — | — | — | ○ | — | ○ | ○ | ○ | ○ | ○ |
| (m+1) | — | ○ | — | ○ | ○ | ○ | ○ | ○ | — | ○ | — | ○ | — | — | — | — |
| m+2 | ○ | — | ○ | — | — | — | — | — | ○ | — | ○ | — | ○ | ○ | ○ | ○ | line

FIG. 31

| field | | 0, 1 | | | 2, 3 | | | 4, 5 | | | 6, 7 | | |
|---|---|---|---|---|---|---|---|---|---|---|---|---|
| sample | | n-1 | n | n+1 | n+2 | n-1 | n | n+1 | n+2 | n-1 | n | n+1 | n+2 |
| line | (m-2) | — | ○ | — | ○ | — | ○ | — | ○ | ○ | ○ | ○ | ○ |
| | m-1 | ○ | — | ○ | — | ○ | — | ○ | — | — | — | — | — |
| | (m-1) | ○ | — | ○ | — | — | ○ | — | ○ | ○ | ○ | ○ | ○ |
| | m | — | ○ | — | ○ | ○ | — | ○ | — | — | — | — | — |
| | (m) | — | ○ | — | ○ | ○ | — | ○ | — | ○ | ○ | ○ | ○ |
| | m+1 | ○ | — | ○ | — | — | ○ | — | ○ | — | — | — | — |
| | (m+1) | ○ | — | ○ | — | — | ○ | — | ○ | ○ | ○ | ○ | ○ |
| | m+2 | — | ○ | — | ○ | ○ | — | ○ | — | — | — | — | — |

FIG. 32

| field | | 0, 1 | | | | 2, 3 | | | | 4, 5 | | | | 6, 7 | | | |
|---|---|---|---|---|---|---|---|---|---|---|---|---|---|---|---|---|---|
| | sample | n-1 | n | n+1 | n+2 | n-1 | n | n+1 | n+2 | n-1 | n | n+1 | n+2 | n-1 | n | n+1 | n+2 |
| line | m-2 | +Q | +R | +S | +P | -R | -S | +P | -Q | +S | +P | +Q | +R | -P | -Q | -R | -S |
| | (m-2) | -P | -Q | -R | -S | +Q | +R | -S | +P | -R | -S | -P | -Q | +S | +P | +Q | +R |
| | m-1 | +R | +S | -P | -Q | +S | +P | +Q | +R | -P | -Q | -R | -S | +Q | +R | +S | +P |
| | (m-1) | +Q | +R | +S | +P | -R | -S | +P | -Q | +S | +P | +Q | +R | -P | -Q | -R | -S |
| | m | +S | +P | +Q | +R | -P | -Q | -R | -S | +Q | +R | +S | +P | -R | -S | +P | -Q |
| | (m) | -R | -S | +P | -Q | +S | +P | +Q | +R | -P | -Q | -R | -S | +Q | +R | +S | +P |
| | m+1 | -P | -Q | -R | -S | +Q | +R | -S | +P | -R | -S | -P | -Q | +S | +P | +Q | +R |
| | (m+1) | +S | +P | +Q | +R | -P | -Q | -R | -S | +Q | +R | +S | +P | -R | -S | +P | -Q |
| | m+2 | +Q | +R | +S | +P | -R | -S | +P | -Q | +S | +P | +Q | +R | -P | -Q | -R | -S |

RECORDING DIGITAL VCR AND A REPRODUCING DIGITAL VCR FOR RECORDING AND REPRODUCING A DIGITAL PAL SIGNAL

BACKGROUND OF THE INVENTION

1. Field of the Invention

The present invention relates to a device such as a digital VCR for the PAL system for digitally recording and reproducing PAL signals on a recording medium, such as a magnetic tape.

2. Description of the Prior Art

As prior art pertinent to the present invention, Japanese Laid-Open (Unexamined) Patent 60-220694 discloses the high speed reproduction of color signals in a digital VCR is disclosed. An explanation thereof follows.

In a digital VCR, digital composite signals to be recorded are numbered by the same address in each field and recorded in a recording circuit system, on the other hand, there is provided a memory in a reproduction system, so that the reproduced digital composite signals are written in the memory with the address assigned thereto, and after a given amount of the composite digital signals are written in the memory, the written signals are read out to reproduce the picture image. The start address of each address to be attached to each field of the digital composite signals to be recorded is attached to the same specific line signals in every video frame, specifically, as to the first field and the second field in one video frame, each address is attached to the line signals situated on the upper line and lower line in an interlaced relationship. In the NTSC system, since the phase of the chrominance signal is reversed every line and every video frame, the start address is attached to the line signals of the positive phase chrominance signal in the first field and the second field and is attached to the line signals of the negative phase chrominance signal in the third and fourth fields. When the recording tape recorded in the above manner is reproduced at a high speed, the digital composite signals across several fields are written in the memory with irregular phases since the phases of the chrominance signals are different from field to field, even if the address is the same. Accordingly, the hue of the reproduced image signal can not be displayed correctly. Considering this, the prior art, the start addresses are attached to the same phase line signals of the chrominance signals from the first field to the fourth field. For example, the start addresses from the second field to the fourth field are attached to the line signal on the line (in the TV picture face) upper by one line in an interlaced relationship. This means an expansion of the line signals of the consecutive four lines in the vertical direction, if an picture made of 1 frame formed of 525 lines is considered. By the arrangement, the line signal of the chrominance signal on the same line can be written into the same address of the memory, without respect to the field, thereby resulting in the correct hue of the reproduced picture during high speed reproduction.

If described in the prior art system is applied to a PAL signal, recording can be effected by attaching the start addresses to the line signals of the chrominance signals of the same phase from the first field to the eighth field according to the color frames of the eight field sequence and recording them. This means that the line signals to which the start address are attached are expanded across the consecutive eight lines in the vertical direction considered on a 1 frame = 625 line basis.

The arrangement mentioned above has two obstacles. One is that the deterioration of the picture quality in the vertical direction in the reproduced picture is large because 8 consecutive lines are dealt with as one identical line during high speed reproduction. Another is that since the region containing the recording lines in which the lines having the start address act as the leading lines moves field to field in the vertical direction by eight lines, dummy lines are formed at the top and bottom portions of the region containing the recording lines. The number of the dummy lines per field is $8/2 - 1 = 3$ lines and therefore, the effective line number per field is the result of the subtraction of 3 from the recording line number.

SUMMARY OF THE INVENTION

An object of the present invention is to provide a recording and reproducing device for digital PAL signals, wherein a color picture can be reproduced during a high speed reproduction with little deterioration of the picture quality of the high speed reproduction picture.

In order to accomplish the above object, a recording device for digital PAL signal according to the present invention is a digital VCR which receives digital PAL signals sampled at 2 m (m is a positive integer) times of the chrominance subcarrier frequency, to provide recording lines containing at least a part of the lines constituting one optional field of the digital PAL signals, and which provides a recording sample in a line (referred to as the in-line recording sample hereinafter), containing at least a part of the samples constituting one optional line in the recording line, to provide a recording sample containing the in-line recording samples of all lines in the recording lines, so as to thereby record the recording samples after digital processing of the recording samples, characterized by comprising a selection range shifting means for setting the selection range of the in-line recording sample included in the samples constituting one line to two kinds of ranges shifted by m samples corresponding to the field number.. in the digital PAL signals.

Moreover, in order to accomplish the object of the present invention, a reproducing device for digital PAL signals according to the present invention is a device VCR for reproducing a recording medium signals recorded on which has been recorded by the above mentioned digital recording VCR for, e.g. - a magnetic tape, digital PAL signals characterized by comprising a selection range reverse shifting means for returning the sample shifted by the selection range shifting means into its original condition (the same condition as the sample input to the selection range shifting means) in response to the field number of the reproduced digital PAL signal or a reference signal.

In order to accomplish the above object, the digital PAL signal reproducing device according to the present invention is a digital VCR for reproducing a signal recorded on a recording medium, e.g. - a magnetic tape, which has been recorded by the above entioned digital PAL signal recording device, characterized by comprising a selection range reverse shifting means for returning the sample shifted by the selection range shifting means into its original condition (the same condition as the sample input to the selection range shifting means) depending on a field number of the reproduced signal or a reference signal, wherein said selection range reverse shifting means is set in a condition of a specific field number without regard to the field number of the reproduced signal during a high speed reproduction mode in which the reproduction is effected across the tracks.

In order to accomplish the above object, the digital PAL signal reproducing device according to the present invention is a digital VCR for reproducing a signal recorded on magnetic tape which has been recorded by the above mentioned digital PAL signal recording VCR, characterized by comprising a selection shifted by the selection range shifting means into its original condition (the same condition as the sample input to the selection range shifting means) depending on a field number of the reproduced signal or a reference signal, and a chrominance signal reversing means for separating the digital PAL signal into a luminance signal and a chrominance signal, so as to thereby reverse in positive direction the phase of the chrominance signal depending on a field number of the reproduced signal, a field number of the reproduced signal and a sample number, and a line number and field number of the reference signal, wherein said selection range reverse shifting means is set in a condition of a specific field number without regard to the field number of the reproduced signal during a high, speed reproduction mode in which the reproduction is effected across the tracks.

BRIEF DESCRIPTION OF THE DRAWINGS

FIG. 8 is a schematic diagram showing an operation of the invention;

FIG. 9 is a schematic diagram explaining the decoders shown in FIGS. 3 and 4;

FIG. 10 is a schematic diagram for explaining the phase of the chrominance signal in the PAL signal except for the M/PAL signal;

Figure 15:
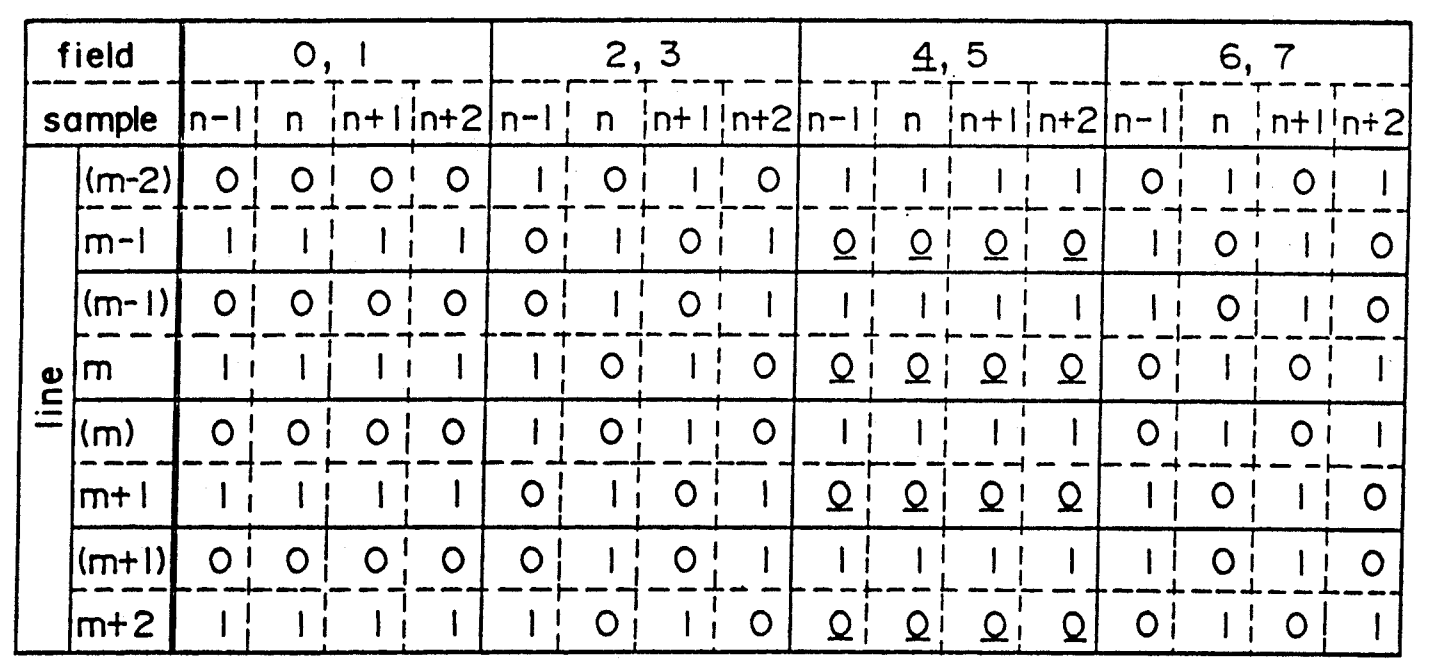

FIGS. 11 to 18 are respectively showing the contents of a decoder in FIG. 7 in the PAL signal except for the M/PAL;

FIG. 19 is a schematic diagram showing the summary of the operation of the decoder in FIG. 7;

FIG. 20 is a schematic diagram showing the terminologies relating to the video signals;

FIG. 21 is a schematic diagram for explaining the sampling axis in the PAL signals except for the M/PAL signal;

FIG. 22 is a schematic diagram showing the operation of the prior art;

FIG. 23 is a schematic diagram for explaining the phase of the chrominance signal in the M/PAL signal;

FIGS. 24 to 31 are respectively schematic diagrams for explaining the contents of the decoder shown in FIG. 7 with respect to the M/PAL signal; and FIG. 32 is a schematic diagram for explaining the sampling axis in M/PAL signal.

DESCRIPTION OF THE PREFERRED EMBODIMENTS OF THE PRESENT INVENTION

Figure 1:
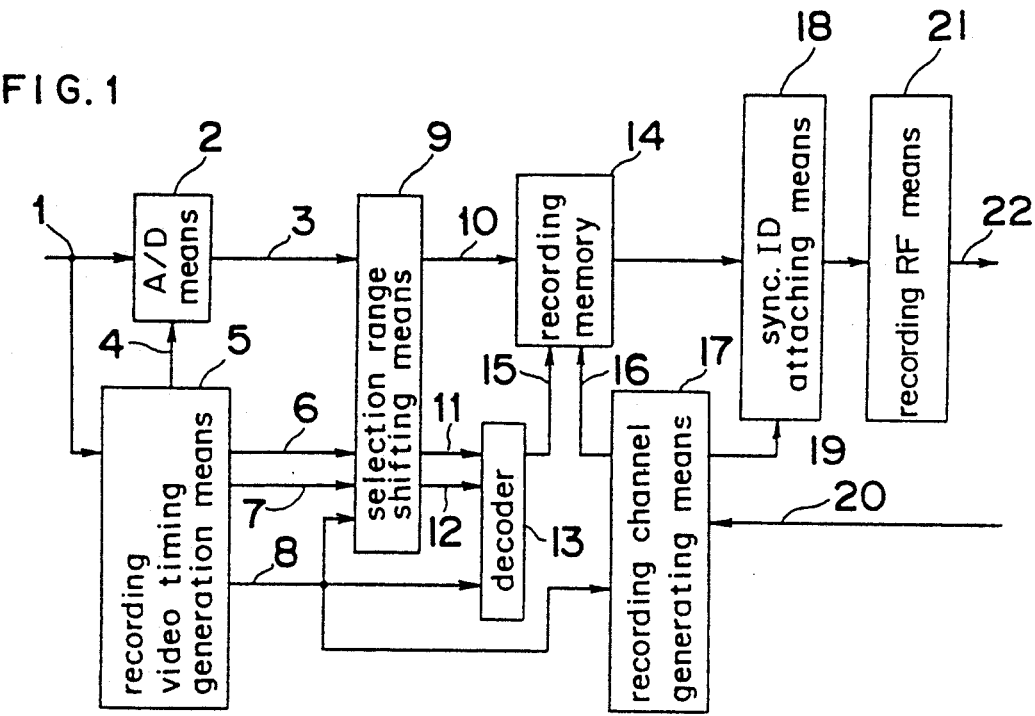
FIG. 1 is a block diagram of an embodiment of a digital PAL signal recording device according to the present invention.

There are various versions in PAL signals such as B/PAL, D/PAL. H/PAL, I/PAL, and M/PAL signals. The explanations the below use the wording PAL signal or PAL signals containing all PAL modes mentioned above; however, a partial explanation separately follows for M/PAL and PAL signals except for the M/PAL signals.

In general, a PAL signal contains the chrominance subcarrier and the color frame period which is a period per one frame consisting of 8 fields. The information for discriminating the respective fields in one frame is called a field number of the first field, the second field and so on and the eighth frame are respectively referred to as field 0, field 1, . . . , field 7.

FIG. 20 is a spatial illustration of one frame of a PAL signal. The fields numbered field 0, field 2, field 4 and field 6 are called even field, the fields and numbered field 1, field 3, field 5 and field 7 are called odd fields. The respective ranges of one field of the even field and odd fields are shown respectively by designations 120 and 123 and the ranges of the line corresponding to the video signal without the field blanking are shown by designations 122 and 125. Usually, ranges 121 and 123 containing the ranges 122 and 125 show ranges of the recording line. In a range 126 of samples which constitute an optional line in the recording lines, the range of the sample except for the line blanking period is indicated by 128. Usually range 127 containing the range 128 indicates a range of the in-line recording sample. All of the in-line recording samples in the recording lines are called recording samples, whereby the digital VCR can record the recording samples by a digital processing. Each sample in 1 field is numbered by the sample number in the horizontal direction and line number in the vertical direction. The timing of the first line number and first sample number in each field is referred to as the field start. The line number includes the field start or line number 0, in PAL signals except for a M/PAL signal with 1 field=312.5 lines an add field may be delayed by 312 lines against the corresponding even field or the former field may be delayed by 313 lines; on the other hand, in an M/PAL signal with 1 field=262.5 lines the odd field may be delayed by 262 lines or the former field may be delayed by 263 lines; it is noted that hereinafter, the description assumes a delay of 313 lines or 263 lines. As to the recording samples, in-line recording samples and recording lines are numbered and they are referred to as the recording sample number and the recording line number. The timing at the first recording line number and the recording sample number is the recording field start.

The structure of the present invention is explained with reference to the drawings.

FIG. 1 is a block diagram showing an embodiment of the digital PAL signal recording device according to the present invention. In FIG. 1, the analog PAL signals from an input circuit 1 is inputted to an analog/digital converting means (A/D converting means) 2 and a recording video timing generation means 5. In the A/D converting means 2, the analog PAL signals are sampled at 4 times the chrominance subcarrier frequency Fsc and converted to digital PAL signals output at path 3. In the recording video timing generation means 5, various timing signals are generated from the analog PAL signal.

Figure 5:
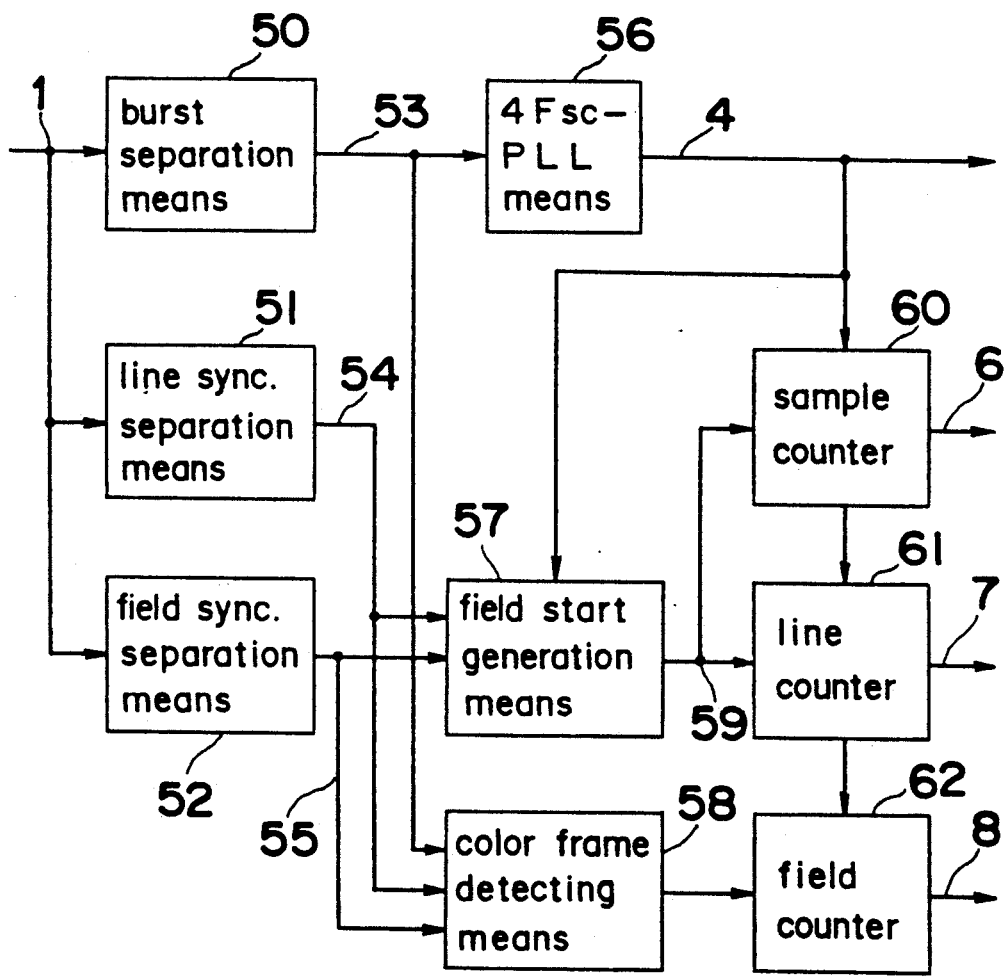
FIG. 5 is a detailed block diagram of a recorded video timing generation means.

FIG. 5 shows a detailed block diagram of the recording video timing generation means 5. In FIG. 5, the analog PAL signals from the input circuit 1 is inputted to a burst separation means 50, line sync. separation means 51, field sync. separation means 52, whereby the burst signal, line sync. signal, field sync. signal are separated from the analog PAL signals and output on to paths 53, 54 and 55. In a 4 Fsc/PLL means 56, a sample clock of 4 Fsc is generated based on the burst from the path 53 and by multiplying the burst by four and outputting it on the path 4. The sample clock is input to the A/D converting means 2 through the path 4 to sample the digital PAL signals or to clock various digital circuits. In the field start generation means 57, based on the sample clock, line sync., field sync. each input from the paths 4, 54 and 55, the field start, which is the start timing of a field is generated and is output on a path 59.

The chrominance subcarrier frequency Fsc of the PAL signals except for the M/PAL against the line frequency Fh is $$Fsc = (1135 \div 4 + 1 \div 625) \times Fh.$$

whereby the sample clock 4 Fsc is $$4Fsc = (1135 + 4 \div 625) \times Fh.$$

Assuming that 1 line consists of 1135 samples, there are generated a surplus of 2 samples in 312.5 lines/1 field. The number of lines/1 field repeats 313 lines and 312 lines alternately. If the even field, consists of 313 lines and the odd field consists of 312 lines, the interval of the field start from the even field to the odd field is:

$$1135 \times 313 + 2 = 355257 \ (clock).$$

on the other hand, the interval of the field start from the odd field to the even field is:

$$1135 \times 312 + 2 = 354122 \ (clock).$$

On the other hand, the chrominance subcarrier frequency Fsc of M/PAL signals against the line frequency Fh is $$Fsc = 909 \div 4 \times Fh$$

and accordingly, the sample clock 4 Fsc is:

$$4Fsc = 909 \times Fh.$$

Namely, 1 line consists of 909 samples. The number of lines in 1 field repeats 263 lines and 262 lines alternately. If the even field consists of 263 lines and the odd field consists of 262 lines, the interval of the field start from the even field to the odd field is:

$$909 \times 263 = 239067 \ (clock).;$$

on the other hand, the interval of the field start from the odd field to the even field is:

$$909 \times 262 = 238158 \ (clock).$$

In the color frame detecting means 58, based on the burst, line sync. signal, and field sync. signal from the paths 53, 54 and 55, the color frame start, which is the color frame start timing occuring every 8 fields, is generated. A sample counter 60 counts the number of the sample clock of 1 field fed from the path 4, namely for the PAL signals except for M/PAL the sample counter 60 counts 1135 clocks; on the other hand, for M/PAL signals the counter 60 counts 909 clocks; the counter 60 is cleared 1 time in every field by the field start from the path 59. A line counter 61 counts the carry output in every line fed from the sample counter 60, and is cleared 1 time in every field by the field start from the path 59. A field counter 62 counts the carry output in every field from the line counter 61, and is cleared 1 time in every color frame by the color frame start from the color frame detecting means 58. The count values of the sample counter 60, line counter 61 and the field counter 62 represent respectively the sample number, line number and field number and are outputted on the paths 6, 7 and 8.

Figure 3:
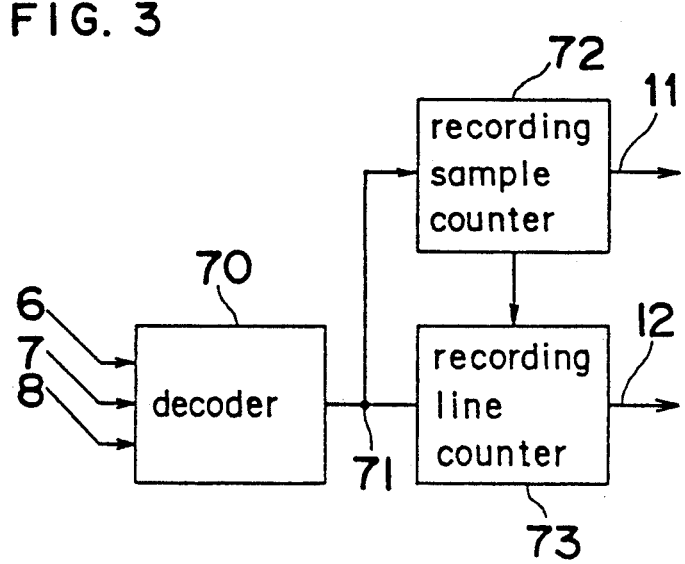
FIG. 3 is a detailed block diagram of an example of a selection range shifting means.

Returning to FIG. 3 a selection range shifting means 9 shifts the selection range of the recording samples in every field in response to the sample number, line number and field number fed from the paths 6, 7 and 8 and the digital PAL signals from the path 3. An example of the selection range shifting means 9 is explained hereinafter. In the example, the digital PAL signal inputted to the selection range shifting means 9 through the path 3 is directly outputted to the path 10 without any processing. The remainders in the selection range sifting means 9 are shown in FIG. 3 by the detailed block diagram. A decoder 70 generates the recording field start to the path 71 based on the sample number from the path 6, the line number from the path 7 and the field number from the path 8. A recording sample counter 72 counts sample clocks by 1135 clocks for the PAL signals except for the M/PAL signal and 909 clocks for the M/PAL signal and is cleared in every 1 field by the recording field start from the path 71, outputting the count value representing the recording sample number to the path 11. The recording line counter 73 counts the carry output fed from the recording sample counter 72 every 1 line, and is cleared in every 1 field by the recording field start from the path 71 and outputs the count value representing the recording line number to the path 12.

The phase of the chrominance signal of the digital PAL signal except for the M/PAL signal, sampled at 4 times the chrominance subcarrier frequency is explained with reference to FIG. 21 and the phase of the chrominance signal of the digital M/PAL signal is explained with reference to FIG. 32.

In FIG. 21, the field number is separated on a frame basis and the contents of 1 frame are shown geometrically according to the sample number in the horizontal direction and the line number in the vertical direction. The line numbers of the odd fields are shown by parenthesis. The sampling axes are taken with four kinds of given angles dividing 360° into four equal angle in a clockwise direction naming the axes P, Q, R and S in the order. The reference symbols attached to the characters represent the burst phase which act as the standard phase of the samples, for example + represents +135° relative to the U axis and — represents −135°. the digital PAL signals shown in FIG. 21 with respect to the spatial and time range, it is on the premise that the luminance signal and chrominance signal have strong correlation's among the respective samples. As shown, the phase of the chrominance signals changes field by field and frame by frame. As to the digital M/PAL signals the phase of the chrominance signals changes as shown in FIG. 32.

By surveying how a specific phase of the chrominance signal for example +P changes corresponding to the field numbers in FIGS. 21 or 32, in each sample number of each line number, the field numbers in which the phase of the chrominance signal becomes +P is shown in FIG. 22. The portions indicated by under lines can contain the field numbers of 0 to 7 completely. According to the shifting of the field numbers which are underlined, by shifting the range of the recording sample in 1 field the phase of the chrominance signal having the recording line number same as the recording sample number has the same phase without regard to the field number as understood by FIG. 21, FIG. 32 and FIG. 22. This is the method of the invention (prior art) disclosed in the prior art specification.

In order to solve the problem of the method of the prior art shown in FIG. 22, in the present example method shown in FIG. 8 is employed. Namely, in FIG. 22 the range of the recording sample to be recorded is shifted in the vertical direction, in contrary to the in the present example (FIG. 8) by shifting two samples in the horizontal direction so that the shifting amount in the vertical direction is reduced.

There are at lease two technical effects in the method of the example (FIG. 8). One is that idle lines which can not be situated at the beginning and ending in all fields have $$4 \div 2 - 1 = 1 \; line$$

whereby the number of the idle line is reduced by two lines per 1 field compared to 3 lines in the prior art method (FIG. 22). However, since in the method of FIG. 8 two samples shift in horizontal direction, there is a possibility of taking excessive 2 in-line recording samples. However, the number of the in-line recording sample uses a value which is easy to divide so as to facilitate the processing of the various digital signals. In the case of PAL signals except for the M/PAL signal, the number of the sample corresponding to 1 in-line video signal has about 922 samples and in the prior art 936 samples, 944 samples are used and 948 samples as the value which is easy to divide and larger than 922. In the case of the M/PAL signal, the number of the sample corresponding to the video signal in 1 line is about 753 samples; however, in the prior art 768 samples are used as the value which is easy to divide and larger than 753 samples. Accordingly, by using the above values there is no need to provide the idle samples in the horizontal direction in the method shown in FIG. 8. As mentioned above, according to the method of FIG. 8, it is possible to reduce an idle space of two lines per 1 field on a tape whereby it is possible to extend the recording time for the constant tape length.

Another technical effect of the method of FIG. 8 is that deterioration of the picture quality during high speed reproduction is reduced. As shown case of high speed reproduction, the method of FIG. 22 below, in the uses 8 samples in the vertical direction as the same sample; however, the method of FIG. 8 uses the 8 samples dispersed in the vertical direction and the horizontal direction as the same sample. Accordingly, the correlation of the samples becomes high when these samples are situated as close as possible whereby the picture quality during high speed reproduction can be improved. The line spacing in one frame is surveyed taking the sample space of 4 Fsc in one line as a unit. For the PAL signals except for the M/PAL signal, the number of the sample corresponding to the video signal per 1 line is about 922 samples, and the number of lines corresponding to the video signal per 1 frame is about 576 lines. The aspect ratio of the video signal on the picture face is 3 : 4; therefore, the conversion value of the number of the samples for 1 line is:

$$922 \div 4 \times 3 \div 576 = 1.2 \; samples/line.$$

In case of the M/PAL, the number of the samples corresponding to the video signal per 1 line is about 753 samples and the number of lines corresponding to the video signal per 1 frame is about 486 lines. Since the aspect ratio of the video signal on the picture frame is 3 : 4, the conversion value of the number of the samples per 1 line is:

$$753 \div 4 \times 3 \div 486 = 1.2 \; samples / line$$

which is the same as the case of the PAL signals except for the M/PAL signal.

Next, the degree of the correlation between the samples is expressed by the larger of the number of the samples in the horizontal direction and the multiple of the number of samples in the vertical direction and the conversion value. The smaller the value, the higher the correlation degree. In both of the methods FIG. 8 and FIG. 22, the value for the vertical direction is larger;

the method of FIG. 22 : 9.6 samples; and the method of FIG. 8: 4.8 samples.

As mentioned above, since the method of the present invention shown in FIG. 8 can take a higher correlation As mentioned above, since the method of the present invention shown in FIG. 8 can take a higher correlation degree of the samples compared to the conventional method of FIG. 22, it is possible to reduce the deterioration of the picture quality when high speed reproduction is performed.

In order to perform the method of FIG. 8, the recording field start is shifted in the horizontal direction and the vertical direction according to the field numbers underlined. In this case, not only the sample which coincides with the recording field start but also, in general, the phase of the chrominance signal of the sample having the same recording sample number and the same line number is constant regardless of the field number. The timing of the recording field start in each field is shown with [0] in the mode 0 of FIG. 9. The values of the sample number and the values of the line number in the columns where the timing is are merely examples but the spatial correlation of [0]due to the change of the field has a sense in the present invention. By constituting the decoder 70 as shown in the mode 0 shown in FIG. 9, the phase of the chrominance signal of the samples each having the same recording line number and the same recording sample number is the same regardless of the field number.

The selection range shifting means 9 was constituted based on FIG. 3. The arrangement shown in FIG. 3 is so constituted as to shift the timing for controlling the signals every field, so that the present invention is realized. It is, however, apparent that the same result as the present embodiment can be obtained if the selection range shifting means 9 is so constituted that the signals are shifted every field with the timing held as is.

Next, the decoder 13 in FIG. 1 generates the writing address of the recording memory 14 by the recording sample number from the path 11 and the recording line number from the path 8. With the arrangement mentioned above, the samples having the same phase of the chrominance signals can be written in the same address of a recording memory 14 regardless of the field number.

The samples written in the recording memory 14 can be read according to the read address inputted through a path 16 from a recording channel timing generating means 17. The read out samples are attached to sync. signals in every suitable sync. block, and ID signals representing the address of the color frame in the sync. block by sync. ID attaching means 18. The ID signal includes the field number. In the recording channel timing generating means 17, the master clock which defines the recording data rate is generated by a crystal oscillator and the various kinds of timings formed by frequency-dividing the master clock are cleared by a PG signal of a rotating drum inputted through an input path 20 so that the rotation phase of the heads and the recording signals are synchronized. The ID signals are formed on the basis of the field number fed from the path 8 and fed to the sync. ID attaching means 18 through a path 19. On the other hand, the sync. block attached with the sync. signals and ID signal is equalized for recording and amplified for recording in a recording RF means 21 and outputted to an output path 22. The signal processed in the recording system in the arrangement from the input path 1 to the output path 22 is recorded on a tape through a recording head.

Figure 2:
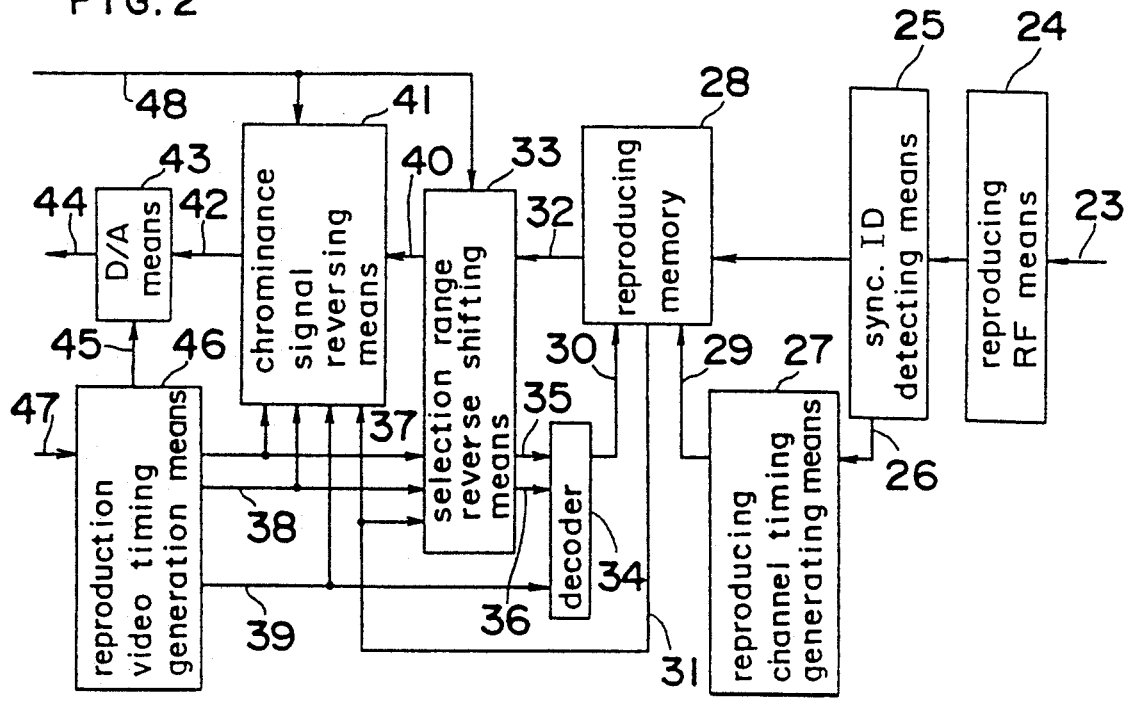
FIG. 2 is a block diagram of an embodiment of a digital PAL signal reproducing device.

FIG. 2 shows a block diagram of an embodiment of the reproducing device of the digital PAL signal according to the present invention.

In FIG. 2, the signal reproduced through a reproducing head from the tape on which the signal is recorded by the recording device mentioned above is inputted to a reproducing RF means 24 through a path 23. The signal equalized for reproduction and converted into binary form in the reproducing RF means 24 is inputted to a sync. ID detecting means 25 to detect the sync. signal, thereby establishing the sync. block and detecting the ID signal. The ID signal is inputted through a path 26 to a reproducing channel timing generating means 27, which generate the writing address and field number in every sync. block unit. The reproduced field number is referred to as a reproduced field number. The sync. block from the sync. ID detecting means 25 is written in a reproducing memory 28 according to the write in address through a path 29 and the reproduced field number.

The reproducing memory 28 outputs the sample to a path 32 according to the read address from the path 30 and also outputs the reproduced field number corresponding to the reproduced sample to a path 31.

Figure 6:
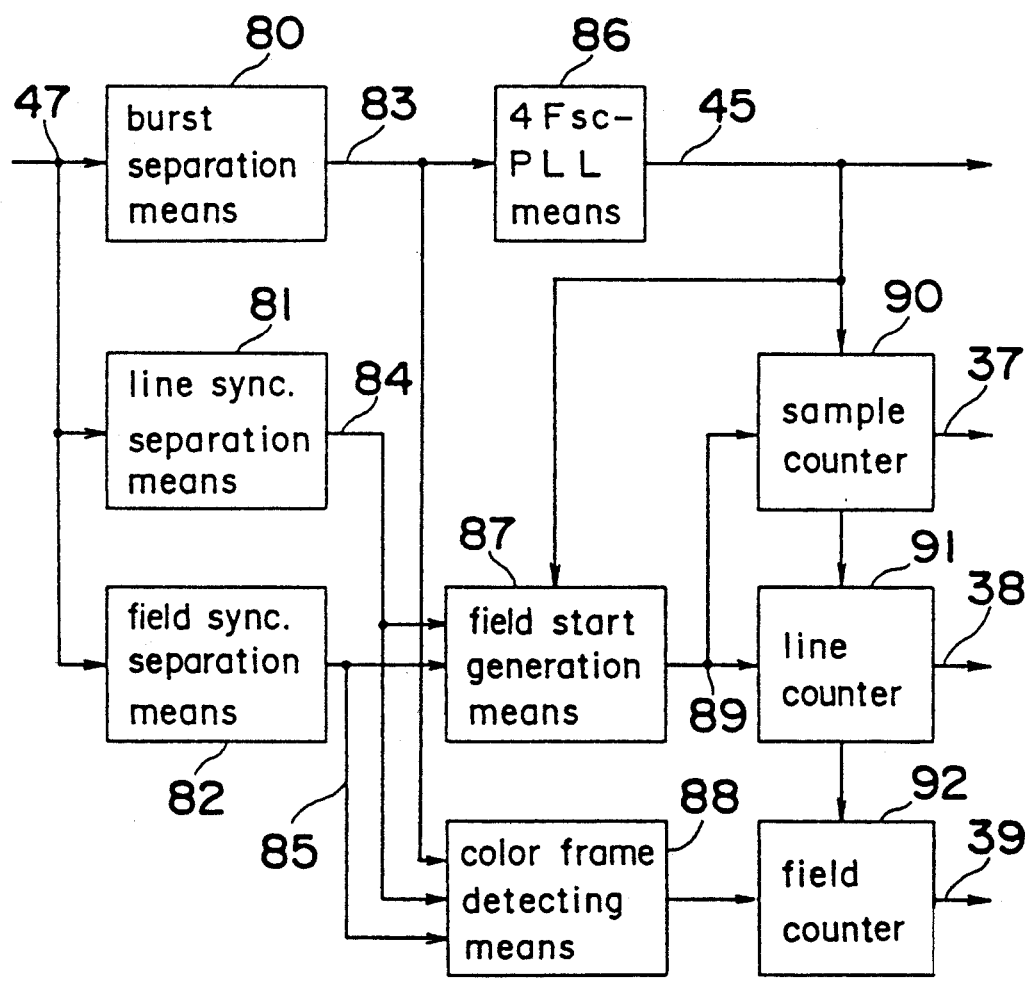
FIG. 6 is a detailed block diagram of a reproduced video timing generation means.

FIG. 6 shows a detailed block diagram of a reproduction video timing generating means 46, which performs the control as mentioned above. The only difference between FIG. 6 from FIG. 5 is that the input from the input path 47 is the reference signal which is used as the standard of the reproduction synchronizing. Accordingly, as explained with reference to FIG. 5, the sample number, line number and field number of the reference signal from the input path 47 are outputted to paths 37, 38 and 39. This field number is referred to as a reference field number.

Figure 4:
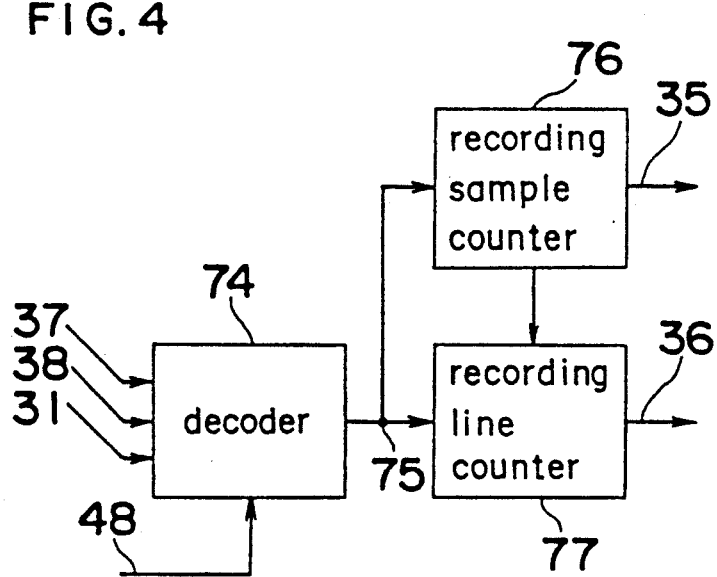
FIG. 4 is a detailed block diagram of an example of a selection range reverse shifting means.

Next, an example of a selection range reverse shifting means 33 is explained. In the present example, the digital signal inputted to the selection range reverse shifting means 33 through the path 32 is outputted to a path 40 directly without any processing. Other portions of the selection range reverse shifting means 33 are shown by the detailed block diagram in FIG. 4. The different point of FIG. 4 from FIG. 3 is that the reproduction field number from the path 31 and the mode switching signal from a terminal 48 are inputted to the input of a decoder 74 in addition to the respective sample number and line number from 37 and 38, whereby the content of the decoder 74 is different from the contents of the decoder 70. Although the contents of the decoder 70 is the same as that in the mode 0 in FIG. 9, the contents of the decoder 74 contains both of the contents of the mode 0 and mode 1 in FIG. 9. Namely, the modes are switched in response to the mode switching signal from an input path 48. The mode 1 is a high speed reproduction mode in which reproduction is made across the tracks and the mode 0 is another reproduction mode such a normal reproduction mode, still reproduction and slow reproduction modes or the on track special reproduction mode in which still, slow or high speed reproduction is performed with on tracking using a movable head. In case of the mode 0, since all of the recorded fields are reproduced in the complete shape, it is necessary to return the sample already shifted every field by the selection range shifting means 9 during the recording period to its original state. For this purpose, it is necessary to generate the recording field start at the same timing as the timing of the decoder 70 in the recording period, whereby the recording sample number and the recording line number are inputted to the decoder 34 shown in FIG. 2 through the paths 35 and 36 and the address, which is the same as the write in address to the recording memory 14 used in the recording period, is used as the read address to the reproduction memory. Since the field number inputted to the decoder 74 is the reproduction field number from the path 31, even if the reproducing memory 28 is repeatedly used several times in such as the still or slow reproduction mode, the reverse shifting is not automatically conducted, whereby inconveniences do not occur. However, if it is limited to the normal reproduction mode, since the reproduction field number and the reference field number coincided, even if the reference number is inputted to the decoder 74 in place of the field number, the same result can be obtained. As mentioned above, in the mode 0, the selection range reverse shifting means 33 performs the process for recovering completely the process performed by the selection range shifting means 9 at the time of recording. On the other hand, for the mode 1, a plurality of samples of a plurality of field are written in the reproduction memory 28, whereby reverse shifting is not required. In this case, a specific field is forcibly fixed. In the mode 1 in FIG. 9, the reproduction field number is fixed to the field 0 or field 3. By the arrangement mentioned above, in the mode 0 the digital PAL signals outputted to the path 40 from the selection range reverse shifting means 33 are not effected badly by the process of the selection range shifting means 9 at the recording period, while in the mode 1, the phase of the chrominance signal becomes normal in the field despite the fact that samples of a plurality of fields are present. However, since the reproduction field number and the reference field number do not always coincide for still and slow reproduction in the mode 0 or in the mode 1, it is necessary to correct the hue using the chrominance signal reversing means 41 in the backward stage. The selection range reverse shifting means 33 is constituted based on FIG. 4. In FIG. 4 the timing for controlling the signals is shifted every field; on the contrary, it is apparent that the selection range reverse shifting means 33 may be constituted to delay the signals every field, holding the timing as is, so that the same result can be obtained.

Figure 7:
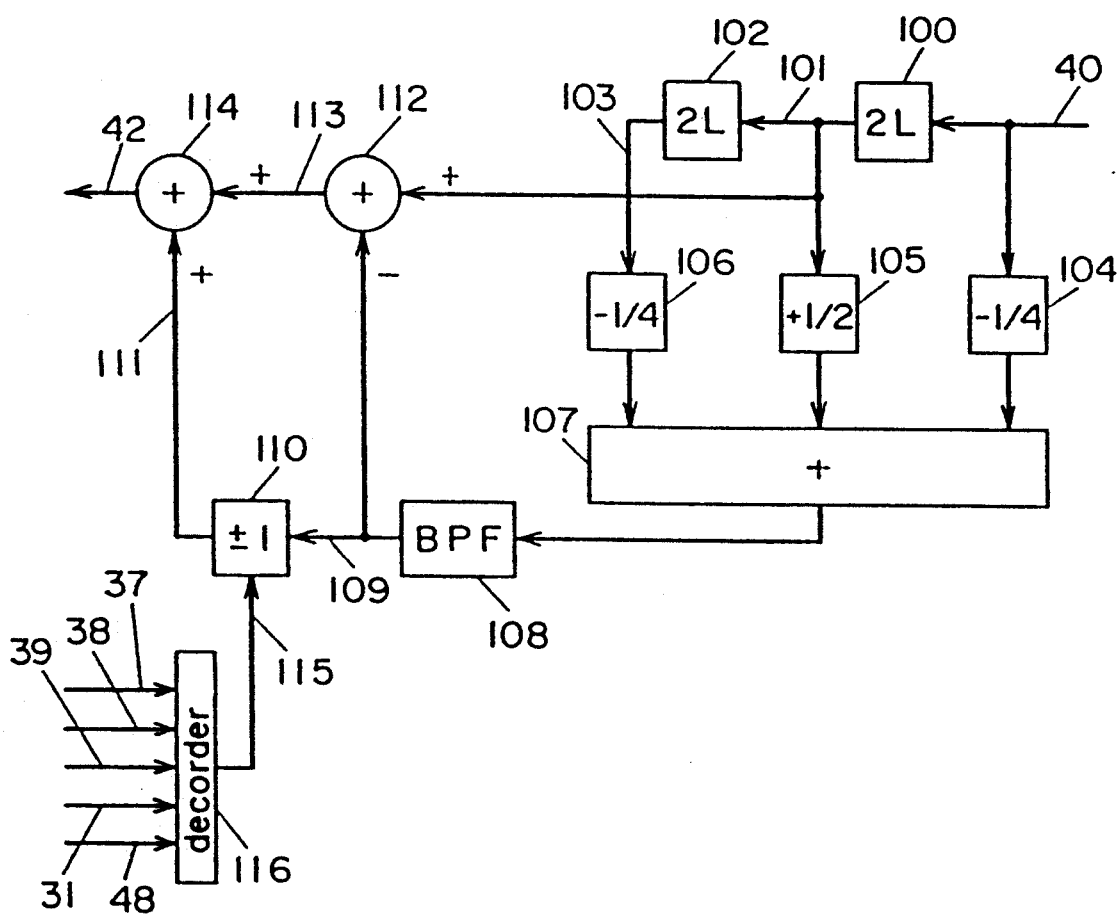
FIG. 7 is a detailed block diagram of a chrominance signal reversing means.

Next, the digital PAL signals from the path 40 are inputted to the chrominance signal reversing means 41. FIG. 7 shows the detailed block diagram thereof.

In FIG. 7, elements 100 and 102 are 2 line delay means to separate the signals from the path 40 into the signal delayed by 2 lines on the path 101 and another signal delayed by 4 lines on the path 103. The signals on the path 40 and the path 103 are multiplied by $-\frac{1}{4}$ in multipliers 104 and 106 and inputted to an adder 107. On the other hand, the signal on a path 101 is multiplied by $+\frac{1}{2}$ by a multiplier 105 and is inputted to the adder 107. In the adder 107 these three inputs are added. As understood from FIG. 21 and FIG. 32 in the PAL signal, the phase of the chrominance signal of the samples separated by 2 lines in the same field is different by 180°. Accordingly, by separating the digital PAL signal into the luminance signal and the chrominance signal, the luminance signal having a relationship in the vertical direction is not contained in the output of the adder 107, whereby the luminance signal without correlation in the vertical direction and the chrominance signal can be obtained. Subsequently, after extracting only the chrominance signal by the bandpass filter 108 having a central frequency of the chrominance subcarrier frequency Fsc, the extracted signal is inputted to a subtracter 112 and a reversible controller 110 in the subtracter 112, the chrominance signal from the path 109 is subtracted from the PAL signal of the path 101 to output the luminance signal to a path 113; on the other hand, in the reversible controller 110, the chrominance signal from the path 109 outputs directly o reversing the phase thereof by 180° in response to the reverse control signal from a path 115 to a path 111. Finally, an adder 114 adds the luminance signal on the path 113 and the chrominance signal on the path 111 to form a digital PAL signal, which is outputted to the path 42.

As mentioned above, a chrominance signal reversing means 41 acts to reverse or not reverse only the phase of the chrominance signal in the digital PAL signal on the path 40 in response to the reverse control signal on a path 115. The reverse control signal is generated in a decoder 116. The decoder 116 receives the sample number, line number, reference field number on the paths 37, 38 and 39 and the reproduction field number on the path 31 and the mode switching signal on the path 48.

Figure 10:
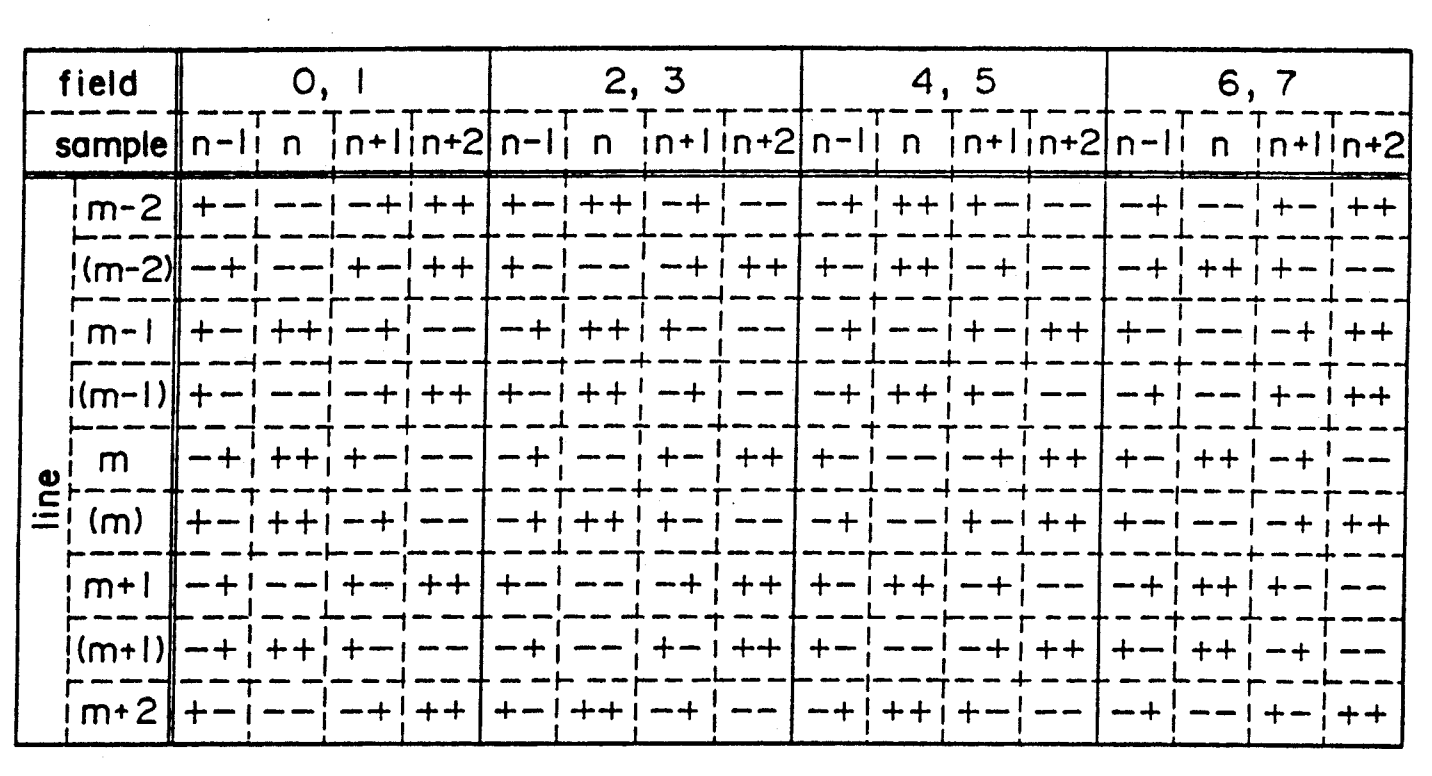
Figure 23:
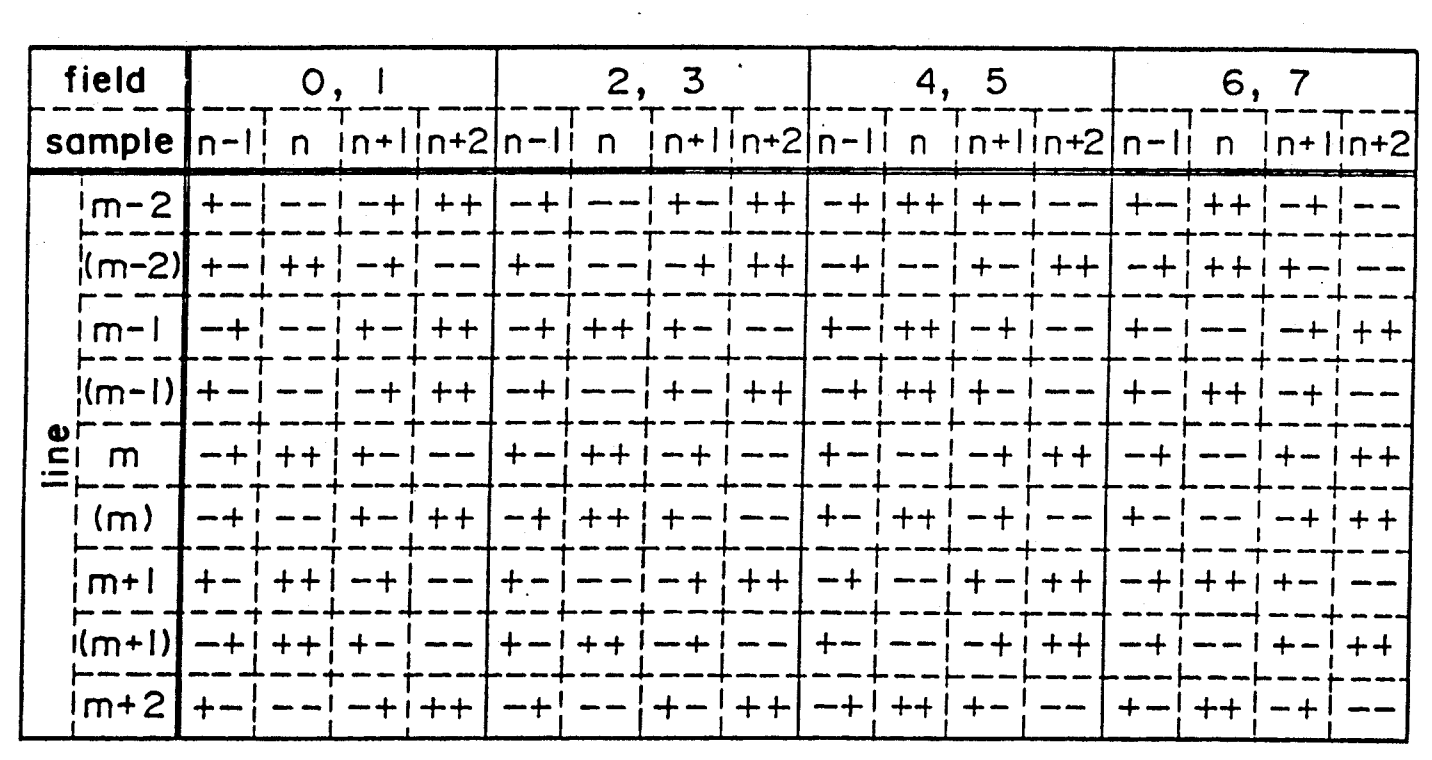

Based on the case of the PAL signal except for the M/PAL signal (FIG. 21) and in case of the M/PAL signal (FIG. 32), the phase relationship of the chrominance signal is surveyed taking 45°, −45°, −135° and 135° against the sampling axes of P, Q, R and S. FIGS. 10 and 23 show the chrominance signals of each of the samples separating the chrominance signals into the U axis component and V axis component with the symbols lined up sequentially. For example, in the field 0, line m, sample (n-1), the symbols are depicted as − + the actual value of the chrominance signal in this case is expressed $-U \cos 45° + V \sin 45°$, wherein (U, V) are color difference signals.

Next, in FIGS. 10 and 23, when the reproduction field number is 0 and the reference field number is changed from 0 to 7 the ways of process of the phase of the chrominance signal of each sample are shown in FIG. 11 and FIG. 24. The underline shows that the reproduction field number is 0. The relationship between the lines of the even field and odd field is such that, for examples, for the line m in the odd field, the line (m−1) of the odd field, 312 lines are delayed as shown in FIG. 11 while 262 lines are delayed in FIG. 24. The values shown in the respective columns shows the reverse control signal and 0 corresponds to "without reverse" and 1 corresponds to "reverse". Similarly, for the reproduction field numbers 1, 2, 3, 4, 5, 6 and 7, in the PAL signals except for M/PAL signal, the states are shown from FIG. 12 to 18 and for the M/PAL signal, the states are shown from FIG. 25 to 31.

FIG. 19 shows the summary of the above relationships. In FIG. 19, the state of the reverse control signal is shown by being sorted depending on such various conditions that for the reproduction signal and the reference signal, the burst phase is in-phase or out-of-phase and the angular difference of the sampling axis is 0°, −90°, −180° and −270°, moreover, in case where the burst phase is different, further sorted depending on the condition that the sampling axis of the reproduction signal is in the group of 135° and −45° or in the group of 45° and −135°.

The decoder 116 of FIG. 7 realizes the contents shown in FIG. 11 to FIG. 18. By the arrangement in the mode 1 in which the high speed reproduction is made by across the tracks or in the mode 0 in which the still reproduction and slow speed reproduction or on track high speed reproduction using a movable head, that is to say, in all kind of reproductions, the signal is converted into a digital PAL signal according to the reference signal, whereby the color picture can be reproduced.

The digital PAL signals outputted on the path 42 of FIG. 2 are converted to the analog PAL signals by the D/A means 43 and are outputted to the output path 44.

As mentioned above, according to the present invention, the idle space of 2 lines on the tape can be reduced, whereby it is possible to extend the available recording time for the same tape length. In addition, since the degree of the correlation among the samples becomes high, the deterioration of the picture quality in the high speed reproduction can be decreased, so that a clear picture during high speed reproduction can be obtained.

What is claimed is:

1. A digital recording VCR for recording a digital PAL signal, and for receiving a digital PAL signal sampled at four times a chrominance sub-carrier frequency as an input signal, and for selecting a plurality of successive samples in horizontal and vertical directions for use as recording samples from among lines constituting one field of the digital PAL signal and for digitally processing said recording samples at each field and for recording the samples on a recording tape, said VCR comprising:
   a recording video timing generation means for detecting the field number of said input digital PAL signal;
   a recording range shifting means for setting the first samples in one field of said recording samples according to said field number into a position defined by a total of eight combinations of two kind of sample numbers shifted by two samples in the horizontal direction multiplied by four successive line numbers counted in a unit of one field in the vertical direction in such a manner that the sub-carrier phase of the first samples is made constant irrespective of said field number; and a sync ID attaching means for dividing said set recording samples into synchronizing blocks and for adding a synchronizing word signal and an ID word signal including said field number to each synchronizing block.

2. The digital recording VCR as claimed in claim 1, wherein said eight combinations of two sample numbers and four successive line numbers are selected from the following combinations:

| | | | |
|---|---|---|---|
| 0 | 4 | 4 | 0 |
| 3 | 7 | 7 | 3 |
| 6 | 2 | 2 | 6 |
| 1 | 5 | 5 | 1 |
| 5 | 1 | 1 | 5 |
| 0 | 4 | 4 | 0 |
| 3 | 7 | 7 | 3 |
| 6 | 2 | 2 | 6 |
| 2 | 6 | 6 | 2 |
| 5 | 1 | 1 | 5 |
| 0 | 4 | 4 | 0 |
| 3 | 7 | 7 | 3 |
| 7 | 3 | 3 | 7 |
| 2 | 6 | 6 | 2 |
| 5 | 1 | 1 | 5 |
| 0 | 4 | 4 | 0 |

3. A digital reproducing VCR for reproducing a digital PAL signal recorded on a tape using a digital recording VCR for recording the digital PAL signal, said recording VCR receiving digital PAL signal sampled at four times a chrominance sub-carrier frequency as an input signal, and selecting a plurality of successive samples in horizontal and vertical directions for use as recording samples from among lines constituting one field of the digital PAL signal for digitally processing said recording samples at each field and recording the samples on a recording tape, said digital recording VCR comprising:

a recording video timing generation means for detecting the field number of said input digital PAL signal;

a recording range shifting means for setting the first samples in one field of said recording samples according to said field number into a position defined by a total of eight combinations of two kind of sample numbers shifted by two samples in the horizontal direction multiplied by four successive line numbers counted in a unit of one field in the vertical direction in such a manner that the sub-carrier phase of the first samples is made constant irrespective of said field number; and a sync. ID attaching means for dividing said set recording samples into a synchronizing blocks and for adding a synchronizing word signal and an ID word signal including said field number to each synchronizing block, wherein said digital reproducing VCR comprises:

a sync. ID detecting means for detecting said synchronizing and ID word signals in said synchronizing block based on a reproduced digital signal from the recording tape and for generating said recording samples; and a recording range reverse shifting means for reverse shifting the recording samples set to said selection range by said recording range shifting means to a timing which is the same as that of the input digital PAL signal depending on the reproduction field number included in the detected ID word or on the field number of a reference signal to be input as a reference of the phase of the reproduction digital PAL signal of said digital reproducing VCR.

4. The digital reproducing VCR as claimed in claim 3, wherein said recording range reverse shifting means is set to a specified field number irrespective of said reproduction field number when in a high speed reproduction mode for reproducing the digital PAL signal across tracks on the recording tape.

* * * * *